United States Patent [19]
Alonzi et al.

[11] Patent Number: 5,144,294
[45] Date of Patent: Sep. 1, 1992

[54] RADIO FREQUENCY MESSAGE APPARATUS FOR AIDING AMBULATORY TRAVEL OF VISUALLY IMPAIRED PERSONS

[75] Inventors: Louis W. Alonzi, Royal Oak; David C. Smith, Fenton; Gary J. Burlak, Rochester Hills; Marion Mirowski, Bloomfield Hills, all of Mich.

[73] Assignee: LDJ Industries, Inc., Royal Oak, Mich.

[21] Appl. No.: 598,988

[22] Filed: Oct. 17, 1990

[51] Int. Cl.$^5$ .............................................. H04Q 1/00
[52] U.S. Cl. ........................ 340/825.49; 340/825.19; 340/825.45; 340/944; 340/991; 340/996; 342/24; 455/129
[58] Field of Search ...................... 340/825.49, 825.45, 340/539, 825.19, 944, 996, 991, 692, 905; 342/24; 455/129

[56] References Cited

U.S. PATENT DOCUMENTS

| | | | |
|---|---|---|---|
| 2,255,055 | 9/1941 | Halstead | 340/905 |
| 3,495,213 | 2/1970 | Nahas | 340/944 |
| 3,922,685 | 11/1975 | Opas | 455/129 |
| 3,973,200 | 8/1976 | Akerberg | 340/825.49 |
| 4,225,953 | 9/1980 | Simon et al. | 340/825.49 |
| 4,253,083 | 2/1981 | Imamura | 340/944 |
| 4,495,495 | 1/1985 | Ormanns et al. | 340/825.49 |
| 4,598,272 | 7/1986 | Cox | 340/825.49 |
| 4,660,022 | 4/1987 | Osaka | 342/24 |
| 4,754,266 | 6/1988 | Shand et al. | 340/692 |
| 4,935,907 | 6/1990 | Friedman | 342/24 |
| 4,961,575 | 10/1990 | Perry | 340/825.49 |
| 4,998,095 | 3/1991 | Shields | 340/825.49 |

FOREIGN PATENT DOCUMENTS

| | | | |
|---|---|---|---|
| 2437037 | 5/1990 | France | 340/944 |
| 0176126 | 7/1989 | Japan | 340/825.49 |

Primary Examiner—Donald J. Yusko
Assistant Examiner—Brian Zimmerman
Attorney, Agent, or Firm—Harness, Dickey & Pierce

[57] ABSTRACT

A radio frequency message apparatus for aiding ambulatory travel by handicapped persons such as blind individuals. The apparatus generally comprises a portable, radio frequency transceiver and a stationary, radio frequency base transceiver unit. The portable radio frequency transceiver is carried on the person of the handicapped individual and transmits a message request signal in response to manual activation of a transmit button thereon by the handicapped individual. The message request signal is received by the base transceiver, which causes the base transceiver to transmit a pre-recorded message signal back to the portable transceiver unit in radio frequency form. The message signal contains location identifying information such as the streets of an intersection at which the base unit is located. The portable transceiver has a limited transmission range of preferably about 20-50 feet to enable it to interrogate a single base transceiver unit located at an intersection within a metropolitan area or at a display/exhibit within a recreational facility such as a zoological park without accidentally interrogating base transceivers in the near vicinity of the desired base transceiver. In a preferred embodiment, an electronic compass is included within the portable transceiver to further aid a visually handicapped individual in orientating himself/herself with respect to North, South, East and Westerly directions.

15 Claims, 6 Drawing Sheets

RADIO FREQUENCY MESSAGE APPARATUS FOR AIDING AMBULATORY TRAVEL OF VISUALLY IMPAIRED PERSONS

BACKGROUND OF THE INVENTION

1. Technical Field

This invention relates to an apparatus for aiding ambulatory travel of handicapped persons, and more particularly to a radio frequency message apparatus for generating and transmitting pre-recorded messages to aid ambulatory travel of visually handicapped persons.

2. Discussion

Many devices currently exist for providing predetermined audio messages. However, such devices are wholly inadequate for use in aiding ambulatory travel of blind persons and other handicapped individuals in areas such as congested suburban and downtown city shopping and business districts. In such applications, visually impaired persons require periodic feedback to enable them to orientate themselves as to which street, street corner and/or intersection they are at as they travel about. Ideally, then, such a guide system would be operable to provide predetermined messages to a handicapped individual upon command from the individual which would help orientate the individual and establish his/her exact location. For example, a predetermined message that was capable of being supplied to a blind person that he/she is standing at a particular intersection would enable the individual to quickly and easily orientate himself/herself and determine his/her exact location. If such information was available to blind individuals periodically as they came to different streets and/or intersections while walking, the information could easily help enable them to quickly and conveniently navigate even congested metropolitan areas having many streets, intersections and complicated traffic patterns.

To be effective, such a system as described above must also be lightweight, portable, self-powered and easily activated by a visually impaired person. Ideally, such a system would be compact enough and of such a light weight that it could be easily secured to an area such as a waist, a sleeve of a shirt or coat, or carried in a shirt pocket of a blind person to enable quick and convenient placement and removal from clothing, as well as quick and easy activation of the device. Such a system would enable a blind person to obtain information on his/her exact location simply by reaching with one hand to a sleeve, his/her waist area, or a shirt pocket and conveniently activating the system to receive a predetermined message.

It should be appreciated that such a device as described above would also enable messages to be easily delivered to other, non-handicapped ambulatory persons in various other applications. For example, such a system would be ideally suited for zoological park tours. In this application, the system could be used to provide predetermined messages relating to various displays and exhibits within a zoo. The system would obviate the inconvenience and annoyance associated with trying to read a sign associated with the display and/or exhibit where crowds, lighting, etc., impede the individual's view of the sign. A device which could be carried on the person of an individual touring the zoo could easily be activated by the individual whenever it is desirable to listen to a description of a particular display or exhibit.

It would further be advantageous if such a message system as described above incorporated a means by which a handicapped individual, such as a blind person, could initiate transmission of a "panic" message from the system. If police and/or other private groups could monitor for such messages, then police or other such individuals could be apprised of a panic situation encountered by a blind person, such as when a blind person becomes lost or so disoriented that he/she believes it will not be possible to determine his/her relative location within a reasonable period of time. Accordingly, if such a panic message was monitored by police or other individuals, the police or other individuals could use the panic message to "home in" and lead them to the lost, handicapped individual.

It is therefore a principal object of the present invention to provide a system for aiding ambulatory travel of handicapped and other individuals in metropolitan areas.

It is a further object of the present invention to provide a base transceiver unit which may be mounted at, for example, an intersection of a suburban or downtown metropolitan area, which is operable to generate and transmit a predetermined radio frequency message signal containing location-indicating information in response to activation by a handicapped individual of a portable transceiver carried on his/her person, which transmits a message request signal to the base transceiver.

It is still a further object of the present invention to provide a radio frequency base transceiver which may be selectively disposed at a particular display and/or exhibit, and which operates to transmit information relative to the display/exhibit to a person upon reception of a signal from a portable, radio frequency transceiver carried on the person of the individual, and selectively activated by the individual.

It is a further object of the present invention to provide a message system having a plurality of base transceiver units selectively disposed at various intersections of a metropolitan area or exhibits/displays within a zoological park, where each such base transceiver unit has a limited range of transmission to thereby avoid radio frequency interference with other base transceiver units stationed in its vicinity.

It is another object of the present invention to provide a radio frequency message system having a portable transceiver unit adapted to be worn on the person of a visually impaired individual, which includes an audio earphone to enable a message received from a base transceiver unit to be listened to privately and inconspicuously.

It is still a further object of the present invention to provide a portable radio frequency message system having an electronic compass, which enables a visually impaired individual to orientate himself/herself with respect to North, South, East and Westwardly directions.

It is yet another object of the present invention to provide a radio frequency message system having a portable, radio frequency transceiver which includes a "panic" button which may be activated by a handicapped person operating the portable radio frequency transceiver, and which operates to transmit a more powerful "panic" message to police or monitoring stations, thereby notifying police or other individuals that a handicapped person is lost, and which will lead police or other individuals to the lost, handicapped individual.

SUMMARY OF THE INVENTION

The above and other objects are provided by a radio frequency message system in accordance with the present invention. The system generally comprises a radio frequency base transceiver unit which is selectively mounted at a street or intersection within a metropolitan area which is frequented by ambulatory handicapped persons such as visually impaired persons, or at a display, exhibit, etc., within a zoological park or other recreational facility. The base transceiver unit is adapted to receive a radio frequency message request signal and to transmit in response thereto a radio frequency message signal representative of a pre-recorded message. The message may contain information relating to a particular street or intersection at which the base transceiver is located, or information relating to a specific display, exhibit, etc. at a zoological park, museum, or other similar recreational facility.

The system further includes a portable, radio frequency transceiver adapted to be carried by, or worn on the person of, an individual. The portable transceiver unit is operable to transmit a radio frequency message request signal to the base transceiver unit in response to a manual command, for example, the pressing of a button by the individual. Upon reception of the message request signal, the base transceiver unit transmits a radio frequency message signal which is received by the portable radio frequency transceiver. The portable radio frequency transceiver then generates an audible message in accordance with the radio frequency message just received which enables the wearer/carrier of the portable transceiver unit to orientate himself/herself relative to the location of the base transceiver unit. If the base transceiver unit has been placed at a particular intersection, then information as to its placement readily informs the carrier of the portable transceiver unit as to his/her relative location.

In a preferred embodiment of the present invention several base transceivers may be employed and selectively disposed at various intersections or other places of a metropolitan area, or alternatively at various displays/exhibits within a zoological park or museum. The base transceiver unit further has a limited transmission range to avoid interfering with the transmission of messages from other nearby base transceiver units. Accordingly, many base transceiver units can be placed at various streets and/or intersections within a relatively compact and crowded area such as a downtown metropolitan area without the base transceiver units generating transmissions which interfere with each other. Thus, a visually impaired individual walking through a crowded, downtown area is able to interrogate each base transceiver unit with his/her portable transceiver unit without unintentionally interrogating other nearby base units which may be only short distances away. In this manner the base transceiver units may be interrogated one at a time as they are approached, thus facilitating ambulatory travel by visually handicapped individuals throughout congested metropolitan areas, and convenient touring by non-handicapped individuals through recreational areas such as zoological parks.

In a preferred embodiment of the invention an electronic compass is also included and operationally associated with the portable transceiver unit. The electronic compass is activatable by the carrier and operates to generate a signal which varies in strength as the portable transceiver is moved in North, South, East and Westwardly directions. Accordingly, the carrier can determine which direction he/she is facing by monitoring the strength of the signal generated by the portable transceiver as the portable transceiver is pointed in North, South, East and Westwardly directions.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
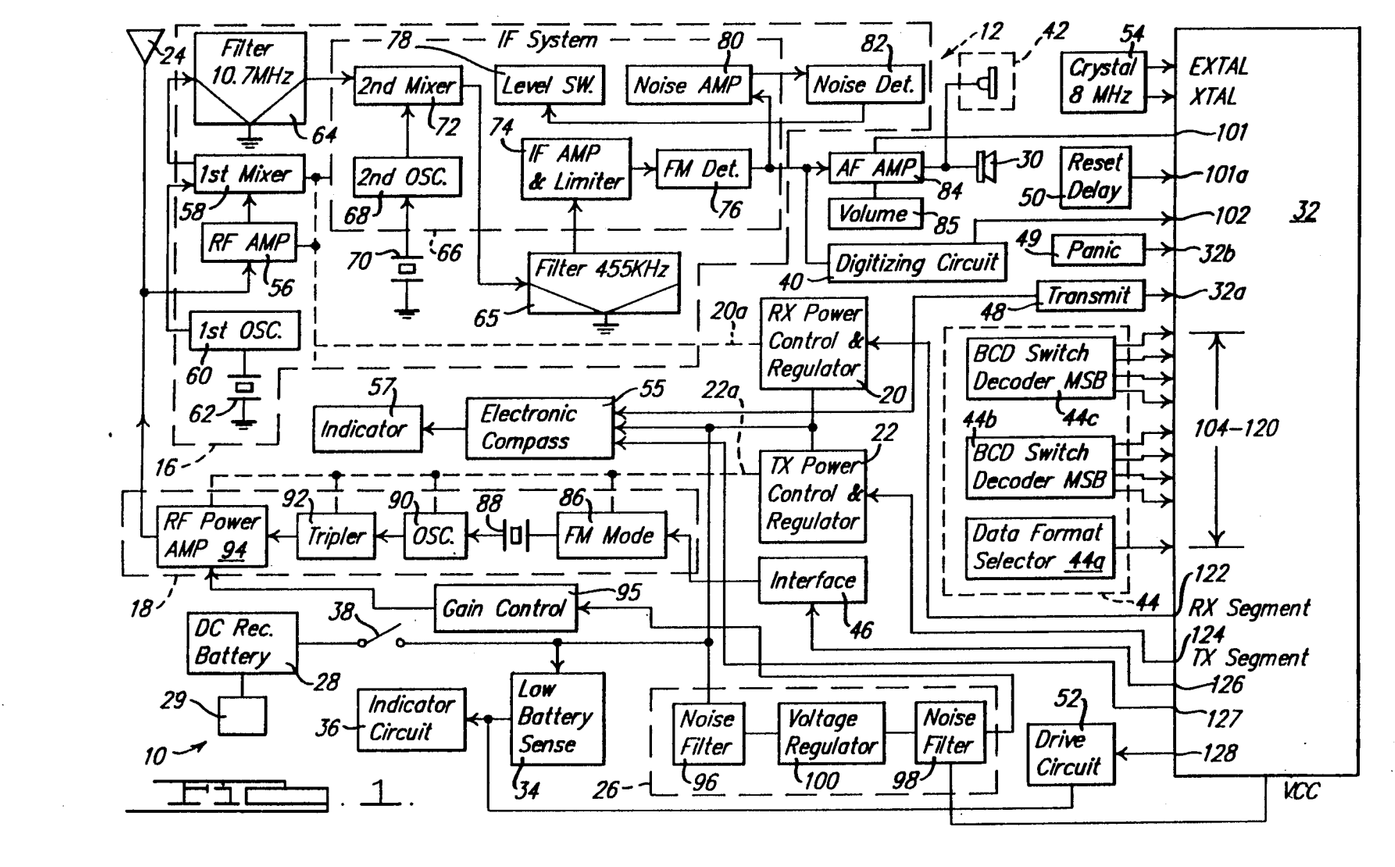
FIG. 1 is a schematic electronic block diagram of a portable radio frequency transceiver unit in accordance with the present invention.
Figure 2:
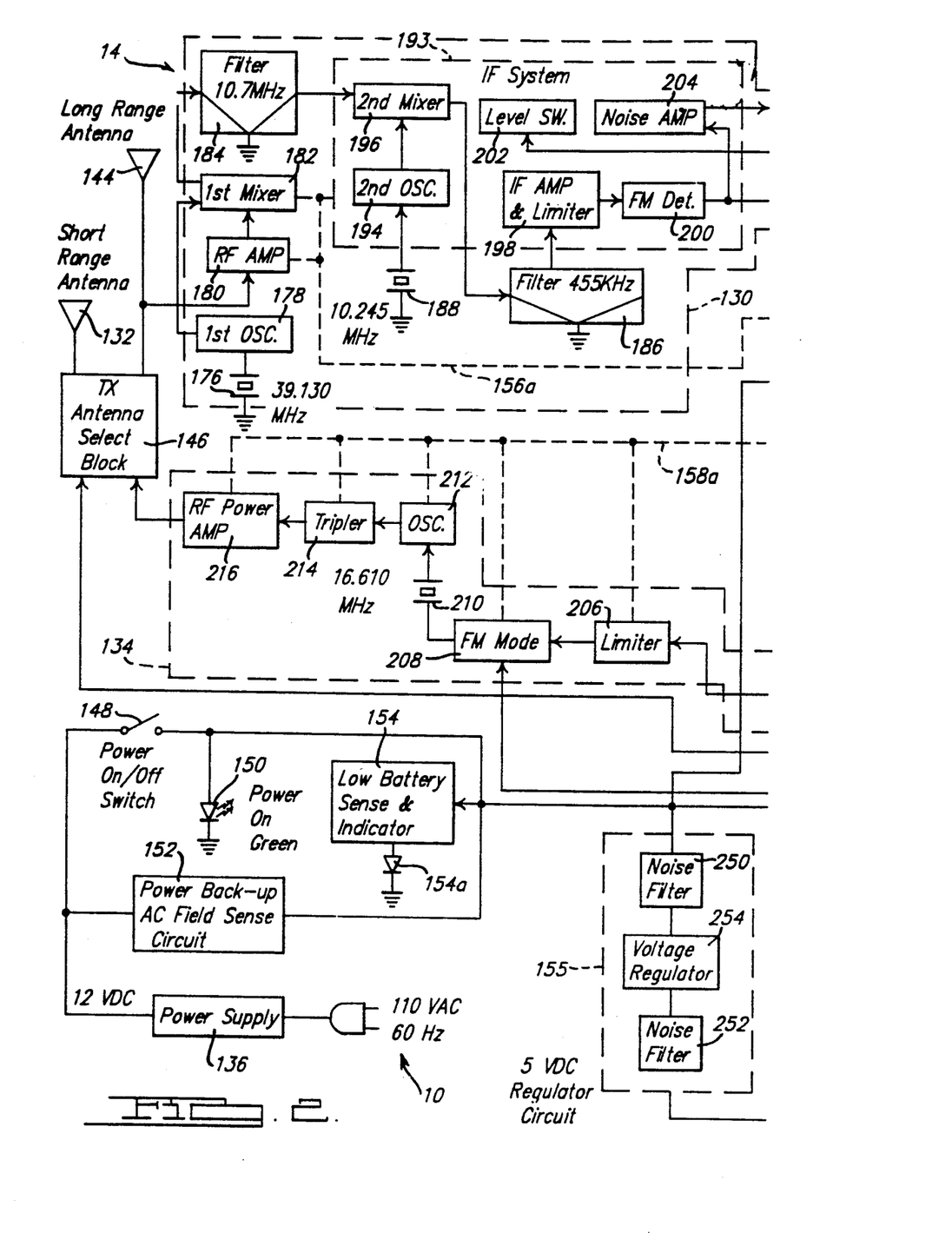
FIGS. 2 and 3 together represent a schematic electronic block diagram of a base transceiver unit in accordance with the present invention.
Figure 3:
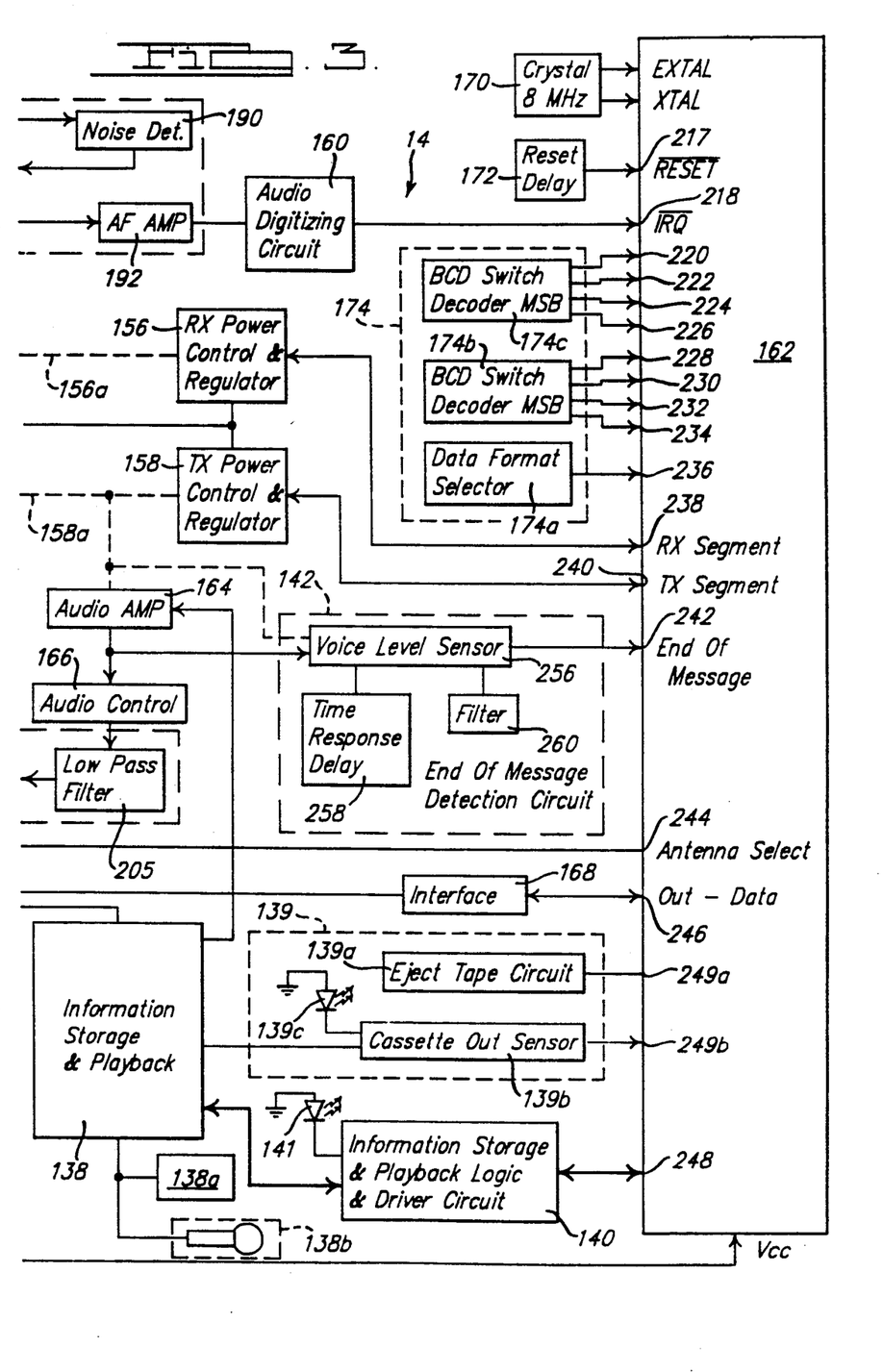

Referring to FIGS. 1-3, a radio frequency message system in accordance with the present invention is shown. Specifically, FIG. 1 illustrates a portable, self-powered, radio frequency transceiver 12 of the present invention. FIGS. 2 and 3 jointly illustrate a radio frequency base transceiver unit 14 of the present invention.

With specific reference to FIG. 1, the portable transceiver 12 generally includes a conventional radio frequency receiver 16; a well-known, conventional radio frequency transmitter section 18; a receiver power control and regulator circuit 20 electrically coupled to the receiver 16, as indicated by dashed line 20a; a transmit power control and regulator circuit 22 electrically coupled to the transmitter section 18, as indicated by dashed line 22a; an antenna 24 coupled to both the receiver and transmit sections 16 and 18; a 5 volt DC regulator circuit 26; a rechargeable DC battery 28; a recharging jack 29 to enable battery 28 to be recharged; an audio loudspeaker 30; and a controller 32. Further included in the portable transceiver unit 12 is a low battery sensing circuit 34 and a low power indicator circuit 36 responsive to the low battery power sensing circuit 34. A power on/off switch 38 is also included for enabling power to be applied to and removed from the various components of transceiver 12.

Further included in portable transceiver 12 is a digitizing circuit 40 comprising a single bit analog-to-digital converter with a level shift; an optional ear phone 42; an optional binary coded decimal thumbwheel switch group 44 having switches 44a, 44b and 44c; a conventional interface 46 for providing a TTL to 9 volt level shift between the controller 32 and the transmitter section 18; a two pole, dual function, transmit "rocker" style transmit/compass switch 48 coupled to an interrupt port 32a of controller 32 for initiating transmission of a message request signal and initiating operation of a direction indicating device (discussed momentarily in the following paragraphs) as well as initiating transmission of optional control commands (also discussed further in the following paragraphs); a "panic" push button 49 coupled to an interrupt port 32b of controller 32 for initiating transmission of a "panic" message signal; reset delay circuit 50; a conventional driver circuit 52 for indicator circuit 36; an 8 MHz crystal 54 for supplying an 8 MHz clock for controller 32; an optional electronic compass 55 coupled to transmit switch 36 and battery 28; and a conventional indicator device 57 coupled to the electronic compass for providing either a tactile or audible indication of the output of compass 55. An electronic compass suitable for use with the present invention with minor modifications by those skilled in the art is commercially available from the Tandy Corporation under Part No. 63-641. The preferred indicator 57 is commercially available from Murata Erie North America, Inc., Smyrna, Ga., and comprises a vibrating electronic element operable to generate a vibrating (i.e., tactile) signal of varying strength. It should be appreciated, however, that conventional and widely available audio or visual devices could also be incorporated in lieu of a tactile signal indicator if an application so requires.

The radio frequency receiver section 16 of portable transceiver 12, which is designed to operate at 49.830 MHz, further includes the following standard components: a radio frequency amplifier 56; a first mixing circuit 58; a first oscillator circuit 60 coupled to a 39.130 MHz crystal 62 and the first mixing circuit 58; and a 10.7 MHz filter 64 coupled to the first mixing circuit 58.

Receiver section 16 further includes a 455 KHz filter 65 and a standard intermediate frequency section 66. Section 66 includes a second oscillator 68; a 10:245 MHZ crystal 70; a second mixer circuit 72; an intermediate frequency amplifier and limiter circuit 74; an FM detector 76; a level switch 78; a noise amplifier 80; and a noise detection circuit 82. The output of FM detector 76 is further coupled to a conventional audio frequency amplifier 84 which drives speaker 30 or optional earphone 42. A conventional rotary-type volume control 85 is also included to enable a user of the transceiver 12 to control the volume of speaker 30 or optional earphone 42.

With further reference to FIG. 1, the radio frequency transmitter section 18 of portable transceiver 12 includes the following conventional components: an FM mode component 86; a 16.610 MHz crystal 88; a 16.610 MHz frequency oscillator 90; a tripler circuit 92; and a radio frequency power amplifier circuit 94. A gain control prescaler circuit 95 is also included and coupled between controller 32 and the RF power amplifier 94. Circuit 95 causes the RF power amplifier 94 to transmit either a high gain signal when the panic mode is entered, or a standard gain signal for normally interrogating the base transceiver 14 to request that a message signal be sent.

With further reference to FIG. 1, the voltage regulator circuitry 26 includes first and second noise filters 96 and 98 respectively, and a voltage regulator 100. Regulator circuit 26 is operable to supply a +5 volt DC voltage to controller 32 and the other various components of the portable transceiver 12.

The optional binary coded decimal thumbwheel switch group 44 of the portable transceiver 12 provides several advantages, one of which is security. By using switches 44a–44c to input a predetermined code into controller 32, the base transceiver 14 can be made to operate to recognize transmissions only from a portable transceiver having a specific, predetermined code set by its thumbwheel switches 44a, 44b and 44c. In this manner, the base transceiver 14 (discussed further in connection with FIGS. 2 and 3) will ignore the transmissions of a portable transceiver 12 which is not transmitting a signal in accordance with an expected "code". Specifically, switch 44a may be used to select the format of the code, for example, whether the code is to be comprised of one or two binary words. Switch 44b may be used to set the value of a first byte (i.e., the LSB) of the code, and switch 44c the value of a second byte (i.e., the MSB) of the code. This feature of the present invention will also be discussed further in the following paragraphs in connection with the operation of the system 10.

The battery 28 of the portable transceiver 12 is preferably a 9 volt, nickel cadmium battery. Accordingly, the battery 28 may be recharged numerous times quickly and conveniently, overnight by coupling it via jack 29 with a conventional battery charger. It should be appreciated, however, that numerous other types of batteries could readily be adapted for use in portable transceiver 12 to power the transceiver 12. Alternatively, the transceiver 12 could easily be modified by those of ordinary skill in the art to include conventional rectification circuitry to enable the portable transceiver 12 to be used with an alternating current power source if an application so required.

The transmit and receive power control and regulator circuits 22 and 20 operate to selectively apply and remove power to the receiver and transmitter sections 16 and 18 respectively as determined by controller 32. Accordingly, the transmitter section 18 of portable transceiver 12 is active (i.e., powered on) only when a signal is to be transmitted from portable transceiver 12. The receiver section 16 is similarly inactive except after the transmitter section 18 has concluded transmission of a message request signal; at this point the receiver 16 is powered up to receive a message signal from base transceiver 14. Thus, by controllably energizing and de-energizing the transmitter and receiver sections 18 and 16 respectively when it is anticipated that they will be used, battery life and the amount of time that the transceiver 12 can be used before recharges of a battery are both prolonged significantly.

To provide an indication to a user of the portable transceiver 12 that battery 34 has reached a condition of unacceptably low charge, indicator circuit 36 may comprise either a conventional audible, visual or tactile alarm. With either type of alarm, a user of the portable transceiver 12 is apprised immediately and unmistakably that the battery 28 of portable transceiver 12 has only a short amount of charge left before it will be unable to power portable transceiver 12.

With further reference to FIG. 1, in a preferred embodiment of the present invention the controller 32 of the portable transceiver 12 comprises an 8 bit microcontroller, and preferably a Motorola 6804J2 microcontroller. The controller 32 includes 256 bytes of internal random access memory (RAM), and 4K bytes of internal read only memory (ROM); a data port 101 coupled to audio frequency amplifier 84 for enabling the controller 32 to provide control signals to drive loudspeaker 30 or earphone 42 to audibly signal a low battery condition, and also that the panic mode has been activated; a reset port 101a coupled to reset delay circuit 50 for enabling controller 32 to be reset after the delay provided by delay circuit 50; a port 102 coupled to the digitizing circuit 40; ports 104–120 coupled to the outputs of switches 44a–44c of optional switch group 44; a port 122 coupled to the receiver power control and regulator circuitry 20; a port 124 coupled to the transmitter power control and regulator circuitry 22; a data code out port 126 coupled to signal amp 46; a port 127 coupled to the gain prescaler circuit 95 for transmitting a high or standard gain control signal to circuit 95; and an indicator enable output port 128 coupled to driver circuit 52. The specific operation of controller 32 and the remaining components of portable transceiver 12 will be discussed momentarily in connection with the overall, simultaneous operation of both the portable transceiver 12 and base transceiver 14.

Referring to FIGS. 2 and 3, the base transceiver unit 14 will now be discussed. Base transceiver unit 14 generally comprises the following components: a receiver section 130; a short range antenna 132; a transmitter section 134; a power supply 136; an information storage and playback device 138; an optional tape control circuit 139 having an eject tape circuit 139a, a cassette out sensor 139b, and a light emitting diode 139c for indicating when sensor 139b has detected the removal of a tape; an information storage and playback logic and driver circuit 140; an optional light emitting diode (LED) 141 for providing a visual indication that logic and driver circuit 140 is active and information storage and playback device 138 is being accessed; and an end of message detection circuit 142. Further included in the base transceiver unit 14 is an optional, long range antenna 144; an optional transmit antenna select circuit 146; a power on/off switch 148; an LED 150 for indicating when power is applied to the base transceiver unit 14; a power back-up/AC field sensing circuit 152; a low battery sensing circuit 154 having a light emitting diode 154a coupled thereto as an indicator; a conventional +5 volt regulator circuit 155; a receiver power control and regulator circuit 156; a transmitter power control and regulator circuit 158; an audio digitizing circuit 160 comprising an analog-to-digital converter with a level shift; a controller 162; an audio amplifier circuit 164; an audio control circuit 166; an interface circuit 168 comprising a TTL to 9 volt level shift circuit; an 8 MHz crystal 170; and a reset delay circuit 172. An optional binary coded decimal thumbwheel switch group 174 is also included having thumbwheel switches 174a, 174b and 174c, and will be discussed further in the following paragraphs.

The components of the radio frequency transmitter and receiver sections 134 and 130 respectively of base transceiver unit 14 are identical to the transmitter and receiver sections 18 and 16 respectively of portable transceiver 12, and are designed to operate at 49.830 ; MHz. This is one of several frequencies within the range of 49.82 MHz–49.90 MHz, which is currently the frequency range reserved by the Federal Communications Commission for intentional radio frequency radiators, as defined in 47 C.F.R., Part 15 Sub-part C, Section 15.235. It should also be noted that radio frequency radiators operating within the range of 49.82 MHz–49.90 MHz are restricted to power levels of 10,000 microvolts per meter or less at a distance of 3 meters, as also currently defined in Section 15.235 of 47 C.F.R.

Receiver section 130 comprises a 39.130 MHz crystal 176; a first oscillator 178; a radio frequency amplifier 180; a first mixer 182; a 10.7 MHz filter 184; a 455 KHz filter 186; a 10.245 MHz crystal 188; and a noise detection circuit 190. An audio frequency amplifier 192 is also included for amplifying the output of receiver section 130 and outputting the amplified output to digitizing circuit 160.

Further included within receiver section 130 is an intermediate frequency section 193. Section 193 comprises a second oscillator 194; a second mixer 196; an intermediate frequency amplifier and limiter circuit 198; an FM detection circuit 200; a level switching circuit 202; and a noise amplifier 204.

The transmitter section 134 of base transceiver 14, as mentioned previously, is identical to that of transmitter section 18 of portable transceiver 12. Transmitter section 134 includes a low pass filter 205; limiter circuit 206; an FM mode device 208; a 16.610 MHz crystal 210; an oscillator circuit 212; a tripler 214; and a radio frequency power amplifier 216. As was also mentioned previously, the components of the transmitter sections 18 and 134 of the transceivers 12 and 14 respectively, as well as the receiver sections 16 and 130, are all standard components which make up conventional, widely known radio frequency and commercially available transmitter and receiver sections.

The transmit power control and regulator circuit 158 is electrically coupled to the transmitter section 134, the audio amplifier 164, and to the voice level sensor 256 of end of message detection circuitry 142, as indicated by dashed lines 158a, and operates to controllably enable and disable power to these components in a manner identical to transmit power control and regulator circuitry 22 of portable transceiver 12. Similarly, receiver power control and regulator circuitry 156 is electrically coupled to the RF power amplifier 180, mixer 182 and second oscillator 194, as indicated by dashed lines 156a, and operates to controllably enable and disable power to these components in a manner identical to receiver power control and regulator circuit 20 of portable transceiver 12.

The controller 162 of the base transceiver 14, similar to the controller 32 of the portable transceiver 14, also comprises a microcontroller, and preferably an 8 bit Motorola 68704J2 microcontroller. The controller 162 includes 256 bytes of RAM and 4K bytes of ROM; a port 217 coupled to the reset delay circuit 172 for enabling the controller 162 to be reset; a port 218 for communicating with digitizing circuit 160, and ports 220–236 for communicating with the switches 174a–174c of optional switch group 174. Controller 32 further includes a port 238 for communicating with the receiver power control and regulator circuit 156; a port 240 for communicating with transmit power control and regulator circuit 158; a port 242 for communicating with the end of message detection circuit 142; a port 244 for communicating with optional antenna select circuit 146; an output port 246 coupled with interface circuit 168 for sending a ramdom identification code generated internally by controller 32; and a data port 248 for communicating with logic and driver circuit 140. If optional tape control circuit 139 is included, a port 249a may be coupled to the eject tape circuit 139a and a port 249b coupled to the cassette out sensor 139b to enable these elements to be monitored by controller 32.

Referring specifically to FIG. 2, the regulator circuit 155 is identical to the regulator circuit 26 of portable transceiver 12, and includes first and second noise filters 250 and 252 respectively, and a voltage regulator 254. Regulator circuit 155 operates to supply a regulated +5 volt DC voltage to power the controller 162 and the other various components of the base transceiver 14.

Referring further to FIG. 2, the addition of long range antenna 144 and antenna select circuit 146, although completely optional, further enhances the utility of base transceiver 14 by providing a means by which a number of base transceiver units may be checked quickly and efficiently to insure that they are operating properly. Specifically, antenna select circuit 146, which comprises conventional logic circuitry and switchable high and low gain amplification circuitry, enables controller 162 to select either the short range antenna 132 and low gain circuitry of circuit 146, or the long range antenna 144 and high gain circuitry of circuit 146, in response to a coded transmission received from portable transceiver 12 or even from another base transceiver 14. Accordingly, base transceiver 14 is operable to transmit signals having low or high signal strengths to thereby controllably vary the distance at which the message signal being transmitted is receivable. As an example of the above, if various base transceivers 14 are located about a metropolitan area or within a facility such as a zoological park, each of the units may be tested almost simultaneously from a remote facility well outside the range of short range antenna 132. Thus, long range antenna 144 and antenna select circuit 146 obviate the need to enter within the much shorter range of reception of antenna 132 to transmit a signal and determine if base transceiver 14 is operating properly. Without long range antenna 144 and antenna select circuit 146, each base transceiver 14 would have to be approached separately with a portable transceiver and interrogated (i.e., tested). By enabling long range antenna 144 and the high gain circuitry with circuit 146, proper operation of one particular base transceiver 14 can be quickly, easily and efficiently verified from a remote location. In applications where many units are placed around a metropolitan area, or even within a zoological park, this feature can save manpower, time and other resources which would otherwise be needed to dispatch an individual directly to the very near vicinity of a particular base transceiver unit 14 to verify its operation.

With further reference to FIG. 2, the power back-up and AC field sensing circuit 152 has been included to provide back-up power in the event of an AC power outage. The back-up power may be provided by a battery or other like power source to insure that the base transceiver 14 remains operational in the event of an AC power outage. Low battery sensing and indicator circuit 154 and LED 154*a* further help to provide a visual indication of a low power condition when a battery or other like power source is being used.

Referring now to FIG. 3, the end of message detection circuit 142 includes a voice level sensor 256, a time response delay circuit 258 and a filter 260. The end of message detection circuitry 142 operates to detect the end of a message transmitted from base transceiver 14, and to inform the controller 162 accordingly. This function of base transceiver 14 will be discussed further in the following paragraphs in connection with the operation of the overall system 10.

With further reference to FIG. 3, the information storage and playback device 138, in a preferred embodiment of the invention, is comprised of a "voice chip" manufactured by Hitachi America Ltd., and commercially available under Part Nos. TC8830AF or TC8831AF. This device is capable of being programmed to generate messages having durations of up to several minutes in length. In an alternative preferred embodiment, device 138 is comprised of a conventional, electro-mechanical, magnetic tape playback device which is operable to playback (and/or record on) a magnetic tape such as a cassette or mini-cassette, which includes the pre-recorded audio message to be transmitted to portable transceiver 12. If information storage and playback device 138 is comprised of a conventional, electro-mechanical magnetic tape playback mechanism, then base transceiver 14 preferably includes optional tape control circuit 139.

As will be discussed further in the following paragraphs, if an electro-mechanical magnetic tape playback assembly is incorporated as information storage and playback device 138, then the system 10 may incorporate additional features to facilitate convenient use of the magnetic tape being used to supply the pre-recorded message. For example, transmit rocker switch 48 could be also used to initiate transmission of a "partial rewind" command, which could be transmitted together with the message request signal for portable transceiver 12. The rewind command could be used to partially rewind the magnetic tape a predetermined amount, for example, the equivalent of 10 or 20 seconds worth of tape, in the event the listener wants to hear a portion of the recording over again while he/she is receiving the message signal. Other functions could also be readily included such as a "pause" command, which could be initiated via rocker style switch 48 and sent to base transceiver unit 14 after transmission of the message request signal has begun. Accordingly, significant remote control capabilities could readily be incorporated by those of ordinary skill in the art if a particular application so required.

Incorporating a voice chip, however, as the information and storage device 138 provides significant advantages over electro-mechanical recording apparatuses such as magnetic tape playback/recording units, one of which is significantly increased reliability. Since moving parts of conventional electro-mechanical playback/recording apparatuses are not used, the overall reliability and durability of the base transceiver unit 14 is increased significantly. In addition, the voice chip has a lower power drain than electro-mechanical magnetic tape playback assemblies, requires less space than an electro-mechanical assembly, is much less affected by humidity and other environmental concerns than conventional electro-mechanical assemblies, and provides a message that will not degrade audibly over time.

If a voice chip is incorporated as the information storage and playback device 138, a conventional microphone jack 138*a* or an optional microphone 138*b* could be incorporated into base transceiver 14 to enable the predetermined message to be selectively changed. Accordingly, if a base transceiver unit 14 is moved to a different intersection of a metropolitan area, thereby necessitating a different message, the voice chip could be readily "reprogrammed" by simply plugging a microphone into jack 138*a* and speaking into the microphone, or speaking directly into optional microphone 138*b* with the new message. This feature provides significant flexibility in that the base transceiver unit does not have to be taken or shipped back to a facility to be reprogrammed with expensive equipment which is often unavailable to the general public. Thus, police officers, members of organizations dealing with handicapped persons, or even individuals associated with private companies can readily, easily and conveniently reprogram the voice chip of the base transceiver 14 without the need for special recording equipment.

A further benefit of employing the voice chip is that the voice chip lends itself to reprogramming more easily if the reprogramming is to be accomplished remotely by an external device. For example, in certain applications it may be desirable to allow one particular (i.e., master) base transceiver 14 to reprogram a message provided by another (i.e., slave) base transceiver 14. Such an operation could readily be provided for by one of ordinary skill in the art by enabling the master base transceiver to transmit the new message via a radio frequency signal to the slave base transceiver along with a command code to inform the slave base transceiver that its voice chip is to be reprogrammed with the new message. Accordingly, it should be appreciated that significant control flexibility is gained by incorporating the voice chip as the information storage and playback device 138.

With reference now to FIGS. 1-3, a general description of the operation of the system 10 will be provided. Initially, the portable transceiver 12 is in a "standby" mode with power to the receiver and transmitter sections 16 and 18 disabled via the receiver and transmitter power control and regulator circuits 20 and 22. A user of the portable transceiver 12 initiates a message request transmission signal by depressing transmit rocker switch 48 to a "transmit" position, which sends a signal to interrupt 32a telling controller 32 to transmit a message request signal. At this point, transmit power control and regulator circuit 22 is enabled via a signal from port 124 of controller 32, and controller 32 generates a message request signal at port 126. Optionally, controller 32 could affix a code in accordance with BCD switches 44a-44c and/or a "high gain selection" code, as a header to the message request signal. The optional high gain selection code could be sent by controller 32 if the portable transceiver 12 is interrogating the base transceiver for diagnostic purposes. The message request signal (and optional identification code and/or gain selection code) is then input to interface 46 along with a reset command to reset the information and storage device and playback device 138 (e.g., rewind the magnetic tape if an electro-mechanical playback device is used) to insure that a complete message signal will be transmitted by the base transceiver 14. Interface 46 in turn outputs the message request signal and its associated codes and/or commands to transmitter section 18, where transmitter 18 transmits the signal via antenna 24 to the base transceiver 14.

While waiting to receive the message request signal, base transceiver 14 is in a "standby" mode. In the standby mode the receiver section 130 of base transceiver 14 is continuously enabled via a signal from receiver segment port 238 of controller 162 and receiver power control and regulator circuitry 156. Conversely, the transmitter section 134 is disabled by a signal from port 240 of controller 162 to transmitter power control and regulator circuit 158. When a message request signal is transmitted from portable transceiver 12 it is received via short range antenna 132 and receiver section 130 before proceeding through audio digitizing circuit 160 and into interrupt port 218 of controller 162. While reception is taking place, controller 162 continues to disable power to transmitter section 134 via the transmitter power control and regulator circuitry 158. Power to end of message detection circuitry 142 is similarly interrupted by transmitter power control and regulator circuitry 158 while the base transceiver 14 is in the standby mode and during reception of the message request signal.

Audio digitizing circuit 160 monitors reception of the message request signal and provides a binary output to port 218 of controller 162 when it detects that reception of the message request signal has concluded. When this occurs, the controller 162 next disables the receiver section 130 via port 238 and receiver power control and regulator circuit 156, and enables transmitter 134 via a signal from port 240 to transmitter power control and regulator circuit 158.

Controller 162 next determines if the message request signal contains an identification code in accordance with BCD switches 44a-44c and/or a code to select a high gain output. If a BCD switch code was received, controller 162 matches it against the BCD switches 174a-174c to determine if the received BCD code matches the BCD code of switches 174a-174c, and hence whether it should respond to the message request signal being received.

Next, controller 162 checks to determine if a high gain selection signal was received and, if so, a control signal from port 129 enables output gain prescaler 95 to cause a high gain signal to be transmitted by RF power amplifier 216. If not, output gain prescaler 95 automatically applies a standard gain signal to RF power amp 94.

In addition to the above codes, controller 162 of base transceiver 14 may optionally generate a "random identification" sub-code upon receipt of a message request signal, which it may store in its RAM for still further identification purposes. The random identification sub-code may be used to prevent interference by a subsequent portable transceiver 12 with a message signal being received by a "prior", interrogating, portable transceiver 12. Accordingly, a portable transceiver 12 which intiates transmission of a message signal from a particular base transceiver 14 is able to receive the entire message signal from that base transceiver 14 without the transmission of that base transceiver being interrupted by a different, "subsequently" interrogating portable transceiver 14. This feature of the present invention will be discussed further in the following paragraphs.

If the random sub-code is generated by controller 162, then controller 162 then optionally sends a reply code, which consists of the randomly generated identification sub-code. The reply code is sent via port 246 to the transmitter 134, whereby transmitter 134 transmits the reply code to the portable transceiver 12. The portable transceiver 12 then stores the random identification code in the RAM of controller 32, and transmits it as a header with any control command it subsequently transmits. The base transceiver 14 then compares any subsequently received control commands with its stored random identification code. If the received random identification code matches its stored random identification code, the controller 162 of base transceiver 14 acts on the command; if not, base transceiver 14 ignores the command. Accordingly, the optional, random identification coding scheme hust described enables the base transceiver 14 to designate the first portable transceiver 12 to interrogate it as a "master" unit, and to ignore control signals transmitted by all other subsequently interrogating portable transceivers until transmission of the message signal to the master unit is complete. The above described coding thus facilitates use of a "multiuser" system, wherein a number of portable transceivers 12 can be employed to interrogate a single base transceiver 14 in an orderly fashion.

Immediately after, controller 162 sends a signal via port 248 to logic circuitry 140 to enable the pre-recorded message to be generated by information storage and playback device 138, which causes device 138 to generate the pre-recorded message. As mentioned previously, the message may contain information relating to a particular location within a metropolitan area, such as the streets of a particular intersection, the names of stores located along a street, information pertaining to a zoological exhibit or museum display, or virtually any other factual information.

The message output from information storage and playback device 138 is then output to audio amplifier 164, which in turn outputs the message signal to audio control circuit 166, transmitter section 134, and voice level sensor 256 of end of message detection circuitry 142. The message signal is then transmitted by transmitter 134 via short range antenna 132 back to the receiver section 16 of portable transceiver 12.

While transmission of the pre-recorded message is taking place, voice level sensor 256 monitors the transmission to determine when it has properly concluded. Time delay circuit 258 provides a time delay of preferably about 1 to 10 seconds to insure that a momentary pause in the pre-recorded memory does not erroneously and prematurely trigger the voice level sensor 256 to inform controller 162 that transmission of the message has concluded. Once the end of message is detected, however, voice level sensor 142 so informs controller 162 via a signal input to controller 162 at port 242. It should be appreciated that once a message request signal has been transmitted by portable transceiver 12, controller 32 thereof automatically enables receiver section 16 via a signal from port 122 to receive power control and regulator circuit 20, and rewinds or resets the information and storage playback unit in anticipation of a return message signal.

The message signal is received by way of antenna 24 and receiver section 16 of portable transceiver 12, and is output to audio frequency amplifier 84. Amplifier 84 in turn drives either loud speaker 30 or optional earphone 42, as selected by the user. The message signal is also input to digitizing circuit 40, which monitors the message signal to determine when it has concluded. When the end of the message signal is detected, digitizing circuit 40 generates a binary signal which is input into digitized audio port 102 of controller 32 to inform controller 32 that reception of the message signal has concluded. At this point, portable transceiver 12 again enters the standby mode and its transmitter and receiver sections 18 and 16 respectively are disabled by power control circuits 22 and 20 respectively.

As discussed previously, the binary coded decimal switch group 44 of portable transceiver 12 and binary coded decimal switch group 174 of base transceiver 14 can be used for security purposes to set the portable transceiver 12 to transmit an identification code as part of the message request signal. Switch group 174 of base transceiver 14 can then be set to an identical code, which controller 162 would compare with the code received from portable transceiver 12. If the two codes match, then controller 162 recognizes that it is being interrogated by an "authorized" portable transceiver 12 and sends the message signal in reply thereto. In this manner, the base transceiver 14 recognizes only transmissions which include a particular code which matches the code set according to switch group 174. This feature enables multiple portable transceivers 12 to be operated within extremely close proximity of each other (i.e., within feet or even inches) without accidentally or unintentionally interrogating an undesired base transceiver 14. It also enables several base transceivers 14 to be placed in extremely close proximity of each other without having several base trasceivers 14 accidentally respond to one particular portable transceiver 12. Accordingly, significant flexibility is afforded in that multiple portable 12 and base transceivers 14 can be used within a small geographic area without interfering with each other.

The randomly generated identification sub-code discussed previously herein provides even further flexibility in that it enables one of two portable transceivers 12 set to the same BCD code via their optional BCD switches to be designated as a "master" unit. In this manner, one particular base unit 14 being interrogated can be made to respond to subsequently transmitted control signals (e.g., partial rewind commands) from only one particular (i.e., master) portable transceiver. This feature is particularly useful in applications where the portable and base transceivers 12 and 14 are being used in close proximity by relatively large numbers of persons, such as in a zoological park to facilitate park tours. In this instance, the randomly generated identification sub-code prevents the transmission of a message signal to a first portable transceiver 12 to be interrupted by a second, interrogating portable transceiver 12 before the transmission to the first portable transceiver 12 has concluded.

With reference now briefly to FIG. 1, if the system 10 is being used in an application to help navigate visually handicapped persons, panic button 49 can be used by the individual to signal a distress situation, such as where the individual is lost and does not believe that he/she will likely determine his/her location within a reasonable period of time. In this instance depressing panic button 49 causes an interrupt to be generated at port 32b of controller 32. This causes controller 32 to generate a signal at port 129, which causes gain control prescaler circuit 95 to configure RF power amplifier 94 to apply a high gain to the signal to be output by transmitter section 18. This enables transmitter section 18 to transmit via antenna 24 a higher signal strength continuous, or continuously intermittent, "panic" signal, which may be received at distances ranging from preferably $\frac{1}{4}-\frac{1}{2}$ mile from portable transceiver 12.

As just mentioned previously, the panic signal generated by controller 32 and transmitter section 18 is a continuous, or continuously intermittent signal which is controlled by controller 32 and enabled for a predetermined period of time, for example, 15 to 30 minutes. After the predetermined period of time the controller 32 automatically ceases application of the panic signal to transmitter section 18. Alternatively, the user of portable transceiver 12 is capable of halting transmission of the panic message by simply depressing panic button 49 twice within a span of preferably about 2 seconds or less. Controller 32 recognizes this as a "cancel" command and terminates panic mode operation. The panic signal enables police and/or other private companies monitoring the frequency of 49.830 MHz to "home in" and locate a lost and handicapped user of the portable transceiver 14 quickly and easily.

As an additional optional feature to verify to a handicapped user of the system 10 that he/she is in fact in the panic mode, controller 32 scans its ports and generates a periodic signal at port 101 when it detects that the panic mode has been entered (i.e., a signal has been input to port 32b). The periodic signal is applied to audio frequency amplifier 84, which drives loudspeaker 30 or optional earphone 42 to emit a periodic, audible message (e.g., a tone) every few seconds. The periodic audible message assures a user that he/she has properly selected the panic mode. It should be appreciated, though, that a tactile or even a visual indication of the panic mode status could be provided in lieu of an audio signal if an application so required.

As a further aid in helping a visually impaired individual orientate himself/herself, optional electronic compass 55 may be employed. Compass 55 may be activated by moving the rocker style switch 48 to a position opposite the transmit position, and holding it in such a position. This causes electronic compass 55 to generate a signal to indicator 57 to cause indicator 57 to begin vibrating as portable transceiver 12 is pointed in different directions. The vibration of indicator 57 varies in strength as the electronic compass 55 is moved to and away from a Northernly direction, in accordance with the Earth's magnetic field. Accordingly, by physically pointing portable transceiver 12 in North, South, East and Westwardly directions, the vibration generated by indicatior 57 in accordance with the output of electronic compass 55 may be used as a tactile signal to enable the individual to determine when the electronic compass 55 is pointing in a Northernly direction, and thus orientate himself/herself accordingly.

The range of transmission of antenna 24 of portable transceiver 12 and antenna 132 of base transceiver 14, while either is in the standard (i.e., "non-panic") mode of operation is approximately about 10-50 feet, and preferably about 20-30 feet. The strength of this signal is preferably about 1,000-2,000 microvolts per meter at a distance of 3 meters. Stated differently, antennas 24 and 132 operate to transmit a signal having a radius of about 10-25 feet therefrom, and preferably a radius of 10-15 feet. In the panic mode, however, signal strength is at its maximum (i.e., 10,000 microvolts per meter at a distance of 3 meters).

Long range antenna 144 of base transceiver 14, in connection with gain selection circuit 146, is similarly operable to transmit a signal therefrom having a signal strength of 10,000 microvolts per meter at a distance of 3 meters, and a transmission range corresponding to a radius of about ¼-½ mile. The relatively short transmission range (of antennas 24 and 132) further prevent the portable and base transceivers 12 and 14 from transmitting information too far, which could interfere with other portable or base transceivers stationed or temporarily resident nearby. Gain control prescaler circuit 95 of the portable transceiver 12, however, enables short range antenna 24 to selectively act as a somewhat "long range" antenna, to thereby send a panic signal having a maximum signal strength at the request of the carrier/operator.

Figure 4:
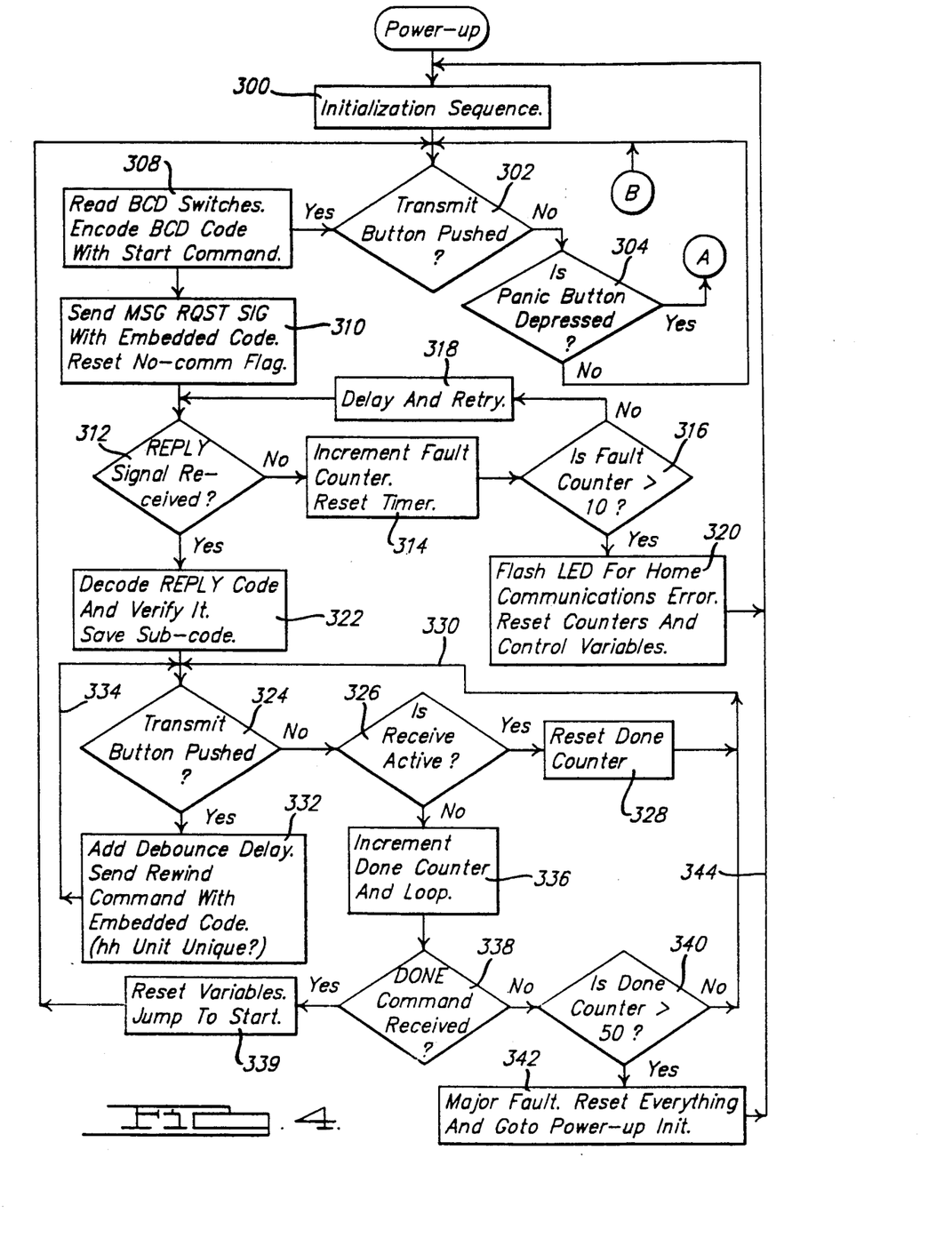
FIGS. 4 and 4A are flow charts of the sequence of events of operation of the portable radio frequency transceiver unit.

Turning now to FIG. 4, a more detailed description of the sequence of operation of the portable transceiver 12 will be provided. As mentioned previously, the portable transceiver 12 initially enters the standby mode when it is first powered up. In the standby mode an initialization sequence is first performed, as indicated at 300. During this phase of operation, the timers, flags and pointers within controller 32 are reset.

Next, a "transmit" mode is entered by portable transceiver 12. In this mode of operation controller 32 checks to determine if rocker style switch 4 has been engaged, indicating that a message request signal is to be transmitted, as indicated at 302. If the transmit button has not been engaged, the system then checks to determine if a "panic" mode has been entered by checking if panic button 49 has been depressed, as indicated at 304. If the panic button 49 has not been depressed, controller 32 again checks to determine if the transmit switch 48 was depressed, as indicated at 302.

Figures 4A, 6, 7:
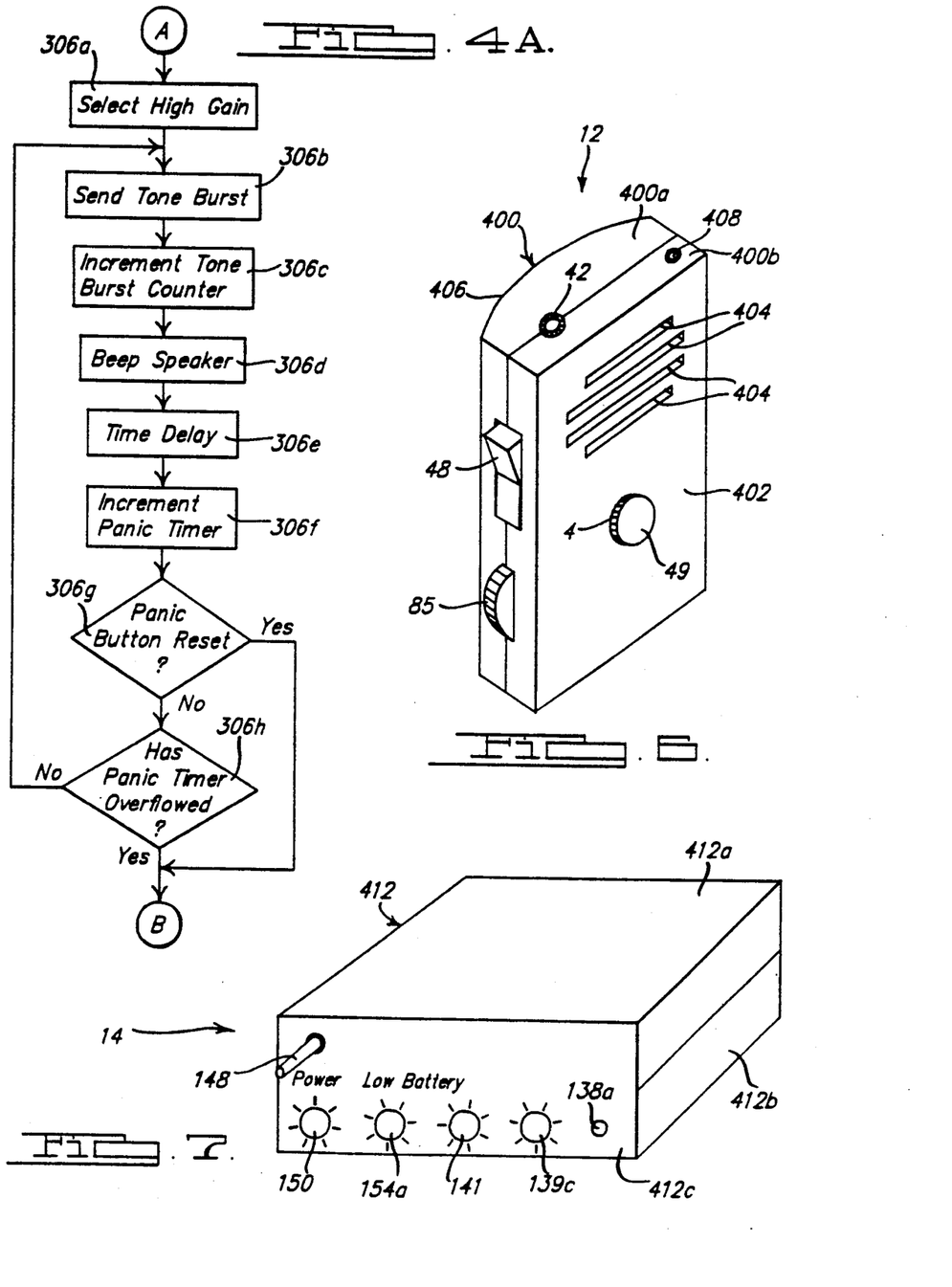
FIG. 6 is an illustration of a housing assembly for the portable transceiver unit of the present invention.
FIG. 7 is an illustration of a housing for the base transceiver of the present invention.

If the panic button 49 was depressed, the panic mode is entered and controller 32 causes gain control prescaler 95 to enable RF power amp 94 to transmit a high gain signal, as indicated at 306a (FIG. 4A). Controller 32 then generates a signal, preferably a 10-15 second tone-burst, as indicated at 306b, which police and/or other groups monitoring the 49.830 MHz frequency can use to "home-in" on the lost user. Next, a "tone-burst" counter within controller 32 is incremented, as shown at 306c, and speaker 30 or earphone 42 is then caused by controller 32 to generate an audible "beep" or "buzz", as indicated at 306d. This verifies for a visually impaired user of the portable transceiver 12 that the panic mode has in fact been entered.

A time delay of preferably 20-30 seconds is then introduced, as indicated at 306e, and a panic mode reset timer is incremented, as shown at 306f. Controller 32 then checks to determine if the panic button 49 has been reset, as shown at 306g; if not, a check is made to determine if the panic mode timer has overflowed, as indicated at 306h. If the panic mode timer has not overflowed, another tone-burst is generated, as indicated at 306b, and the process of sending other 10-15 second tone-burst and another audible indication to the user that he/she is still in the panic mode is then repeated. If the panic mode timer has overflowed, then the panic mode is terminated, and the initialization sequence is repeated, as indicated at 300 on FIG. 4.

Accordingly, in the panic mode the portable transceiver 12 sends out periodic, 10-15 second tone-bursts which police and/or other individuals can use to locate the lost user. The panic mode is not terminated until the tone-burst counter reaches a predetermined count, as shown at 306f, indicative of preferably 15-30 minutes of panic trnsmissions, at which time the panic button 49 is programmatically reset. At this time the panic mode is terminated and the controller 32 again begins checking to determine if the transmit button 48 has been pushed, as indicated at 302 on FIG. 4.

With reference to FIG. 4, if the transmit switch 48 has been pushed, the transmit mode operation continues with controller 32 reading the optional binary coded decimal switches 44a-44c. The controller 32 then encodes the selected binary coded decimal code with a start command, as indicated at 304. Controller 32 next enables transmitter section 18, and portable transceiver 12 then transmits an embedded binary coded decimal code (in the form of a header) and the message request signal. A "no communications" flag within controller 32 is finally reset, as indicated at 310.

The portable transceiver 12 then enters a "reply mode" and waits to determine if a reply signal in the form of a message is received, as indicated at 312. If no message signal is received within preferably about one second, a "done" counter within controller 32 is incremented and an associated timer is reset, as indicated at 314. If the number of attempts to receive the message signal is less than about 10, as indicated at 316, a slight delay of preferably about 2–3 seconds is introduced and another attempt is made to receive the message signal, as indicated at 318. If more than 10 attempts have been made to receive the message signal, then a signal is generated at port 101 causing amplifier 84 to drive either speaker 30 or earphone 42 to produce a distinctive, audible error message before the counters and control variables of controller 32 are reset, as indicated at 320. Accordingly a user of the portable transceiver 12 is quickly apprised of an error condition thus eliminating the uncertainty of whether or not his/her message request signal was actually transmitted and/or received.

If a reply, i.e., message signal, is received, it is verified and its code (i.e. random identification sub-code) is saved, as indicated at 322. If an electro-mechanical, magnetic tape playback/recording system is being used a the information storage and playback device 138, then controller 162 of the base transceiver 14 further operates to detect reception of a partial rewind, pause or other command transmitted by portable transceiver 12 while transceiver 12 is transmitting the message signal. Accordingly, it should be appreciated that in this instance the receiver power control and regulator circuit 156 will be controlled to enable power to also be applied to the receiver section 130 of base transceiver 14 while a message signal is being transmitted.

The controller 32 of portable transceiver 12 then checks interrupt port 32a to determine if switch 48 has been pressed again, as indicated at 324. If switch 48 has not been depressed again, the audio digitizing circuit 40 is then checked, as indicated at 326. If audio digitizing circuit 40 is active, the done counter within controller 32 is reset, as indicated at 328, and switch 48 is checked again, as indicated by line 330 to determine if it has been depressed again. If it is found that the transmit switch 48 was initially pushed, as first indicated at 324, then debounce delay is added, as indicated at 332, and the switch 48 is again checked, as indicated by line 334.

At this point of operation an "error watch" mode is entered. Specifically, audio digitizing circuit 40 is checked to determine if a message signal is being received. If the audio digitizing circuit 40 is not active, then controller 32 knows that either a message signal has been completed and reception has been halted, or if no reception has taken place, that an error has occurred. In either event, the done counter is incremented, as indicated at 336, and a check is made to determine if a done command has been received in connection with the transmission of the message signal, as indicated at 338. If a done command was received, all control variables associated with controller 32 are reset as indicated at 339, and the controller 32 checks again to determine if the transmit pushbutton 48 has been depressed, as indicated at 302. If no done command has been received, and if the done counter indicates less than preferably about 50, as indicated at 340, then the transmit switch 48 is checked again, as indicated at 324 to determine if it has been pushed. If the done counter reads greater than about 50, the system 10 knows that a major fault has occurred and resets all of the counters, pointers and flags within controller 32, as indicated at 342, and loops back as indicated by line 344 to perform another initialization sequence.

Figure 5:
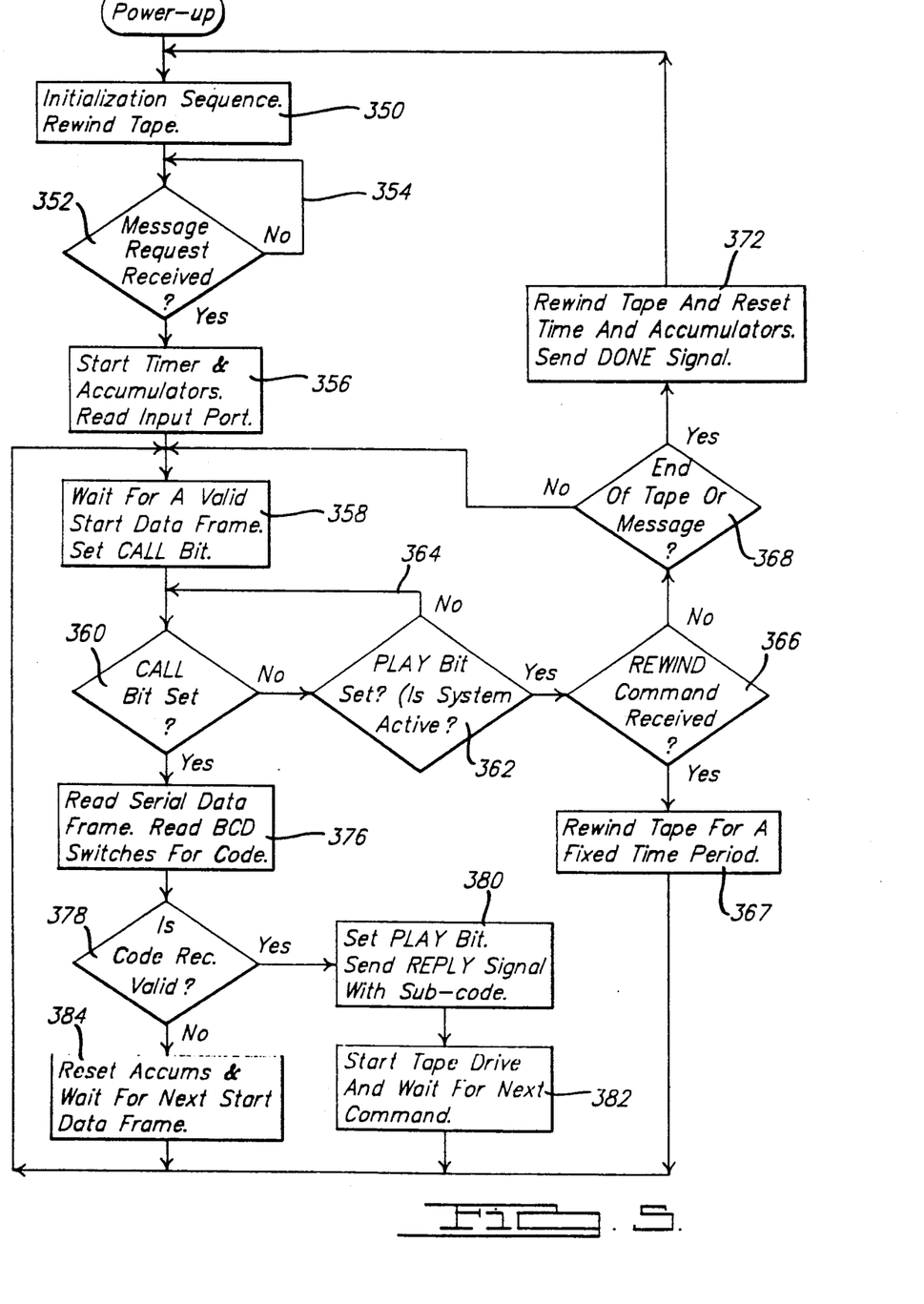
FIG. 5 is a flow chart of the sequence of events of operation of the radio frequency base transceiver unit.

Turning now to FIG. 5, a more detailed explanation of the sequence of operation of base transceiver unit 14 will be provided. Upon power up, base transceiver 14 enters a "standby" mode. In this mode an initialization sequence is first performed, as indicated at 350. If a conventional magnetic tape playback/recording unit is incorporated, its magnetic tape is rewound and the receiver section 156 is enabled.

Next, a check is made by controller 162 at interrupt port 218 to determine if a message request signal has been received, as indicated at 352. If no message request signal has been received, then controller 162 waits a predetermined period of time, preferably about 10–100 milliseconds, and then loops back, as indicated by line 354, to make another check.

If a message request signal was received, then a timer and the accumulators within controller 162 are reset, as indicated at 356. Port 218 of controller 162 is then read to receive the message request signal. The base transceiver 14 then waits for a valid start data frame and sets a "call" bit within controller 162 indicating a message request signal has been received, as indicated at block 358.

A check is next made to determine if the call bit within controller 162 has been set, indicating an embedded code was received as part of the message request signal from portable transceiver 12, as indicated at 360. If the call bit was not set, a check is made of a "play" bit within controller 162 to determine if the base transceiver 14 is currently in a "play" mode transmitting a message signal, as indicated at 362. If the play bit within controller 162 has not been set, then the system 10 loops back as indicated by line 364 to recheck if the call bit has been set and remains in the standby mode.

If the play bit within controller 162 has been set, the controller 102 of portable transceiver 14 knows transceiver 14 is currently in the play mode. In this mode, a check is first made to determine if a rewind command (assuming a magnetic tape playback apparatus is being used) has been received as indicated at 366. If no rewind command was received, then a check is made to determine if the end of a magnetic tape being used or an end of the message signal was detected, as indicated at 368. If no end of tape or message signal was detected, the base transceiver 14 loops back and waits for a valid start data frame as indicated at 358. If a rewind command was received, the tape is rewound for a fixed period of time, as indicated at 367, before again looping back to wait for a valid start data frame. If the end of tape or the end of a message signal was detected, then the tape is rewound and the counter and accumulators within controller 162 are reset, as indicated at 372. In addition, the done signal is sent to portable transceiver 12, as also indicated at 372, and the base transceiver 14 then loops back to perform another initialization sequence.

If the call bit was set, as checked for at 360, then the system enters the play mode. While in this mode, the serial data frame transmitted by portable transceiver 12 is read, and the switches 174a–174c, if included, are read to obtain a preselected identification code, as indicated at 376. A check is next made to determine if the identification code received is valid, as indicated at 378 and, if so, the play bit within controller 162 is set. At this point, if a conventional, electromechanical tape drive is being used, the tape is rewound. Alternatively, if a voice chip is being used it is reset. The message signal is then sent by the base transceiver 14 along with the randomly generated sub-code generated by controller 162, as indicated by block 380, to the portable transceiver 12.

Base transceiver 14 next waits for the next command from portable transceiver 12, as indicated at 382, before looping back to wait for another start data frame. If a valid identification code was not received, as indicated at 378, then the accumulators within controller 162 will be reset and base transceiver 14 will wait for the next start data frame to be transmitted from portable transceiver 12, as indicated at 384, before looping back to wait for another valid start data frame.

Referring now to FIG. 6, there is shown an example of a housing 400 for portable radio frequency transceiver 12. Housing 400 is preferably a multi-piece housing having sections 400a and 400b. A front portion 402 of the housing section 400b is flat and includes a plurality of openings 404 to enable sound to pass from speaker 30 therethrough. Section 400a, conversely, includes a rear section 406 which is convex in shape to enable a visually impaired person to quickly orientate himself-/herself and determine how he/she is holding the unit.

The housing sections 400a and 400b include openings for the optional earphone jack 42, dual function, rocker style transmit/compass switch 48 and the volume control 85. An opening 408 is also included in housing section 400b for the recharging jack 29, in addition to an opening 410 in front portion 402 for the panic button 49. Opening 410 preferably includes a recessed shoulder portion to enable panic button 49 to be slightly recess mounted. Recess mounting panic button 49 helps prevent accidental, unintentional activation of the panic button 49 when the portable transceiver 12 is being handled. Recharging jack 29 enables the portable transceiver 12 to be placed onto a conventional battery charger 12 and quickly and easily recharged after periodic use. It should also be appreciated that conventional recharging circuitry could also be included within housing 400, i.e., as part of portable transceiver 12, if so desired. Moreover, the above mentioned components could readily be placed at a wide variety of positions on housing 400, and housing 400 could further comprise a wide variety of shapes.

Housing 400 further includes dimensions which make it preferably easy to hold with a single hand. Accordingly, the portable transceiver 12 may be stored in a pocket and pulled out for use. Alternatively, the portable transceiver 12 is compact enough and lightweight enough so that it can just as easily be carried within a pouch on a shirt sleeve or in a shirt pocket.

Referring now to FIG. 7, there is shown a housing 412 for use in connection with base transceiver unit 14. Housing 412 generally comprises separable upper and lower housing portions 412a and 412b in addition to a face plate 412c. Openings 414–422 exist in face plate 412c for enabling power on/off switch 148 to be accessed, power-on LED 150 and indicator 154a of low battery sensing circuit 154 to be visually checked to determine the state of operation of the transceiver 14, and microphone jack 138a to be accessed. Further included are openings for optional LED 141 for indicating when the base transceiver unit 14 is being accessed, and optional LED 139c for indicating when a cassette has been removed from a base transceiver 14, if base transceiver 14 incorporates a conventional, electro-mechanical magnetic tape playback assembly. It should also be appreciated that the shape of the housing 260 could take a wide variety of forms if so needed to suit specific applications.

Both of the housings 400 and 412 are preferably made from lightweight materials such as plastic, although other materials such as aluminum and metal could readily be employed if so desired. If made from plastic, the housings may be injection molded. In addition, a number of housings are commercially available through various cabinet manufacturers which may suit specific applications without modification.

It should be appreciated that if base transceiver 12 is to be outdoors, for example, adjacent a traffic light, housing 412 will preferably comprise a waterproof housing assembly. To circumvent the deleterious affects of unfavorable weather, however, base transceiver 14 may be pplaced within a store adjacent its associated intersection. In this instance, a weather "resistant" only enclosure will serve to adequately protect the transceiver 14.

Representative values for the various components of the system 10 are as follows, although it should be appreciated that a wide variety of other values and/or components could be incorporated by those skilled in the art:

| REFERENCE NUMERAL | COMPONENT/PART NO. |
| --- | --- |
| 20 | transistor, 2N4401; diode, 1N5235; transistor, SK3124A |
| 22 | transistor, 2N4401; transistor, SK9132; diode, 1N5226 |
| 28 | 9 volt rechargeable nickle cadmium battery |
| 32 | Motorola 8-bit microcontroller, 68704J2 |
| 34 | transistor, 2N4401 |
| 36 | transistor, 2N4401; light emitting diode (LED) |
| 50 | capacitor; resistor |
| 52 | transistor, 2N4401 |
| 56 | transistor, SK3124A |
| 58 | transistor, 2SC3195 |
| 60 | transistor, SK3122 |
| 64 | E107M |
| 65 | LFB15 |
| 66 | IC, MC3357 |
| 82 | diode, 1S2473 |
| 84 | audio amplifier, LM386 |
| 86 | FM diode, MV2205 |
| 90 | transistor, SK3122 |
| 92 | transistor, SK3122 |
| 94 | transistor, SK3124A |
| 96 | capacitor, .001 ufd |
| 98 | capacitor, .0047 ufd |
| 100 | IC, LM7805 |
| 140 | IC, MC4011B |
| 146 | DPDT relay; transistor, SK3124A; or IC, TA8050P |
| 154 | transistor, 2N4401 |
| 156 | transistor, 2N4401; diode, 1N5235; transistor, SK3124A |
| 158 | transistor, 2N4401; transistor, SK9132; diode, 1N5226 |
| 160 | transistor, 2N4401; diode, 1N4001 |
| 162 | Motorola 8-bit microcontroller, 68704J2 |
| 164 | audio amplifier, LM386 |
| 166 | transistor, 2SA1267GR |
| 167 | resistor, 6.8k; capacitor, 0.1 ufd |
| 168 | transistor, 2N4401 |
| 172 | capacitor, 1 uf; resistor, 8.2K |
| 178 | transistor, SK3122 |
| 180 | transistor, SK3124A |
| 182 | transistor, 2SC3195 |
| 184 | E107M |
| 186 | LBF15 |

| REFERENCE NUMERAL | COMPONENT/PART NO. |
|---|---|
| 190 | diode, 1S2473 |
| 193 | IC, MC3357P |
| 206 | resistors, 100K, 10K, 12K; capacitors, .01 uf, .001 uf |
| 208 | diode, MV2205 |
| 212 | transistor, SK3122 |
| 214 | transistor, SK3122 |
| 216 | transistor, SK3124A |
| 250 | capacitor, 220 uf |
| 252 | capacitor, 220 uf |
| 254 | IC, LM7805 |
| 256 | IC, LA2000; IC, LM311N |

From the foregoing, it should be apparent that although the present invention has particular utility in helping handicapped individuals navigate congested metropolitan areas, it is also readily adaptable to a wide variety of uses. More specifically, the present invention can be used in virtually an application where factual data is to be imparted upon demand to an individual.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus for aiding ambulatory travel by a visually handicapped person, comprising:

first transceiver means operable to be carried and held in a hand of a visually handicapped person for transmitting a message request signal in response to a command from a handicapped individual, said message request signal having a limited signal strength corresponding to a first transmission distance;

said first transceiver means having battery means for providing power thereto;

second transceiver means fixedly disposed at a predetermined reference location for receiving said message request signal once said message request signal is transmitted by said first transceiver means while said first transceiver means is within a predetermined reception distance of said second transceiver means, and for generating in response thereto a modulated, radio frequency, location-indicating message signal; and said first transceiver means further having means for receiving said modulated, radio frequency, location-indicating message signal and automatically generating in response thereto a modulated, location-indicating audio message in accordance with said modulated, radio frequency, location-indicating message signal, said audio message being operable to audibly inform said visually handicapped person of said person's arrival at said previously unknown reference location and the identity of said previously unknown reference location;

and wherein said first transceiver means comprises electronic compass means responsive to the earth's magnetic field and selectively controllable by said handicapped person for generating upon request by said handicapped person a directional indicating signal of varying signal strength as said electronic compass means is pointed in North, South, East and Westerly geographic directions, said directional indicating signal being perceptible by said handicapped person to aid said person in becoming orientated relative to said North, South, East and Westerly geographic directions.

2. The apparatus of claim 1, wherein said first transceiver means further comprises:

power-sensing means for sensing a power level of said battery means; and indicating means for generating a signal indicative of said power level of said battery means.

3. The apparatus of claim 1, wherein said first transceiver means further comprises:

a radio frequency transmitter; and transmitter power control means for controllably energizing said radio frequency transmitter.

4. The apparatus of claim 1, wherein said first transceiver means comprises:

panic signal select means for enabling said handicapped individual to initiate transmission of a location-indicating panic signal; and panic signal generating means responsive to said panic signal select means for transmitting said location-indicating panic signal, said panic signal having a higher signal strength than said message request signal.

5. The apparatus of claim 1, wherein said second transceiver means further comprises receiver power control means for controllably energizing said radio frequency receiver.

6. A radio frequency apparatus for informing visually handicapped persons of their arrival at a previously unknown reference location and informing said persons of the identity of said reference location, said method comprising:

a radio frequency base transceiver fixedly disposed at a predetermined, previously unknown reference location for receiving a message request signal;

information storage and playback means operatively associated with said base transceiver for storing and generating at least one modulated, predetermined, location-indicating message signal;

controller means operatively associated with said base transceiver and responsive to said message request signal for controllably initiating playback of said predetermined message signal;

a portable, hand-holdable radio frequency transceiver manually controllable by a visually handicapped person, said portable transceiver being operably to transmit said message request signal to said base transceiver and to receive said predetermined message signal in response thereto; and said portable transceiver having a limited transmission distance of about 50 feet;

means operatively associated with said portable, radio frequency transmitter for receiving said predetermined message signal and automatically generating therefrom a representative audio signal operable to inform said person of said person's arrival at said previously unknown reference location and the identity of said reference location and electronic compass means operatively associated with said portable, hand-holdable radio frequency transceiver for generating a user perceptible directional signal of varying strength in accordance with the earth's magnetic field, in response to a manual request signal by said user, said directional signal indicating to said user when said portable, hand-holdable radio frequency transceiver is pointing in a desired geographic direction as said portable, hand-holdable radio frequency transceiver is manually pointed in North, South, East and Westerly geographic directions by said user.

7. An apparatus for aiding ambulatory travel by visually impaired persons, said apparatus comprising:
 a portable, hand-holdable radio frequency transceiver adapted to be carried on the person of an ambulatory, visually impaired individual, said portable transceiver having means for enabling said ambulatory, visually impaired individual to controllably initiate transmission of a radio frequency message request signal having a limited signal strength corresponding to a first transmission distance and radio frequency receiver means for receiving in response thereto a modulated, radio frequency, location-indicating message signal;
 said portable transceiver having rechargeable, portable battery means associated therewith for providing power thereto;
 a radio frequency base transceiver fixedly disposed at a previously unknown, predetermined reference location frequented by ambulatory, visually impaired persons, said base transceiver having a predetermined reception range and information storage and playback means for storing and generating said modulated, radio frequency, location-indicating message signal, and controller means responsive to said message request signal for controlling said information storage and playback means, said base transceiver being operable to transmit said radio frequency, location-indicating message signal to said portable transceiver when said portable transceiver transmits said message request signal while said portable transceiver is disposed within said predetermined reception range; and
 said portable transceiver further having means for receiving said location-indicating message signal and automatically generating in response thereto an audible message to inform said visually impaired individual person of his/her arrival at said previously unknown, predetermined reference location, and the identify of said reference location;
 and wherein said portable radio frequency transceiver further comprises a North-indicating electronic compass for generating a signal of varying strength as said portable radio frequency transceiver is pointed in North, South, East and Westerly directions, to thereby help said visually impaired individual become orientated relative to a particular said direction.

8. The apparatus of claim 7, wherein said base transceiver further comprises:
 power supply means for supplying power thereto; and
 power sensing means responsive to said power supply means for sensing a power level of said power supply means.

9. The apparatus of claim 7, wherein said base transceiver further comprises means responsive to said information storage and playback means for detecting the end of said location-indicating message signal when said signal is being transmitted therefrom.

10. The apparatus of claim 9, wherein said means for detecting the end of said location-indicating message signal comprises:
 voice level sensor means responsive to said location-indicating message signal for detecting the end of said message signal and generating a control signal indicative of an end of message condition;
 time response delay means responsive to said voice level sensor means for providing a predetermined time delay to insure that transmission of said location-indicating message signal has concluded before said voice level sensor generates said end of message control signal.

11. The apparatus of claim 7, wherein said base transceiver further comprises:
 a first antenna having a first transmission range responsive to said message request signal for transmitting said location-indicating message signal;
 a second antenna having a second transmission range responsive to said message request signal for transmitting said location-indicating message signal; and
 antenna select means coupled to said first and second antennas and responsive to said controller means for controllably selecting one of said first and second antennas and supplying a first gain signal when said first antenna is selected, and a second gain signal when said second antenna is selected, to thereby controllably vary the distance said location-indicating message signal is transmitted.

12. The apparatus of claim 7, wherein said portable radio frequency transceiver further comprises:
 power sensing means responsive to said battery means for monitoring a power level of said battery means; and
 power indicator means responsive to said power sensing means for providing an indication to said visually impaired individual of said power level of said battery means.

13. The apparatus of claim 7, wherein said portable radio frequency transceiver further comprises:
 panic signal select means for enabling said visually impaired individual to initiate transmission of a location-indicating panic signal; and
 gain control means responsive to said panic signal select means for causing said portable transceiver to generate and transmit said location-indication panic signal, said panic signal having a signal strength higher than that of said message request signal.

14. The apparatus of claim 7, wherein said information storage and playback means comprises an integrated circuit voice chip for storing and generating at least one said location-indicating message signal.

15. The apparatus of claim 7, wherein said information storage and playback means comprises an electromechanical, magnetic tape playback recording apparatus.

* * * * *